US008216109B2

(12) United States Patent
Dahl et al.

(10) Patent No.: US 8,216,109 B2
(45) Date of Patent: Jul. 10, 2012

(54) TORQUE-BASED CONTROL SYSTEM FOR A CONTINUOUSLY VARIABLE TRANSMISSION

(75) Inventors: Kristofor Lee Dahl, Yorkville, IL (US); Brian Douglas Hoff, East Peoria, IL (US); Richard George Ingram, St. Charles, IL (US); Michael Anthony Spielman, Jr., Brookfield, IL (US); Benjamin B. Schmuck, Glenn Allen, IL (US); Alberto Martinez, Jr., Lisle, IL (US); Yaang Zhao, Surrey (CA)

(73) Assignee: Caterpillar Inc., Peoria, IL (US)

( * ) Notice: Subject to any disclaimer, the term of this patent is extended or adjusted under 35 U.S.C. 154(b) by 1158 days.

(21) Appl. No.: 11/905,194

(22) Filed: Sep. 28, 2007

(65) Prior Publication Data
US 2009/0088295 A1  Apr. 2, 2009

(51) Int. Cl.
B60W 10/10 (2012.01)
(52) U.S. Cl. .......................................................... 477/37
(58) Field of Classification Search .................... 477/52, 477/68, 37
See application file for complete search history.

(56) References Cited

U.S. PATENT DOCUMENTS

| 4,107,776 A | 8/1978 | Beale |
| 4,653,004 A | 3/1987 | Osanai et al. |
| 4,653,006 A | 3/1987 | Osanai et al. |
| 4,715,012 A | 12/1987 | Mueller, Jr. |
| 4,720,793 A | 1/1988 | Watanabe et al. |
| 4,793,217 A | 12/1988 | Morisawa et al. |
| 5,157,992 A | 10/1992 | Hayashi et al. |
| 5,218,540 A | 6/1993 | Ishikawa et al. |
| 5,413,540 A | 5/1995 | Streib et al. |
| 6,019,701 A | 2/2000 | Mori et al. |
| 6,059,686 A | 5/2000 | Takahashi |
| 6,345,221 B2 | 2/2002 | Hattori et al. |
| 6,440,037 B2 | 8/2002 | Takagi et al. |
| 2004/0014557 A1 | 1/2004 | Carlson et al. |
| 2004/0209718 A1* | 10/2004 | Ishibashi et al. ................ 474/18 |
| 2005/0090962 A1* | 4/2005 | Ota et al. ........................ 701/51 |
| 2005/0103555 A1 | 5/2005 | Cannon et al. |

FOREIGN PATENT DOCUMENTS

| EP | 1275552 | 1/2003 |
| JP | 59-219558 | 12/1984 |
| JP | 4-258563 | 9/1992 |
| JP | 9-229172 | 9/1997 |
| JP | 10-329586 | 12/1998 |
| JP | 2004-1761 | 1/2004 |
| JP | 2005-299446 | 10/2005 |

OTHER PUBLICATIONS

Norval P. Thomson et al., "A CVT System Having Discrete Selectable Speed Ranges," U.S. Appl. No. 11/700,196, filed Jan. 31, 2007, 23 pages.

* cited by examiner

*Primary Examiner* — David D. Le
*Assistant Examiner* — Erin D Bishop
(74) *Attorney, Agent, or Firm* — Finnegan, Henderson, Farabow, Garrett & Dunner LLP

(57) ABSTRACT

A continuously variable transmission is provided having a driven element. The continuously variable transmission also has at least one operator input device configured to transmit a transmission operating mode request and at least one other operator input device configured to transmit a driven element output request. In addition, the continuously variable transmission has at least one sensor configured to sense at least one parameter indicative of an operating condition of the transmission. The continuously variable transmission further has a controller configured to regulate an output of the driven element in response to the operating mode request, the driven element output request, and the at least one sensed parameter indicative of an operating condition of the transmission.

19 Claims, 5 Drawing Sheets

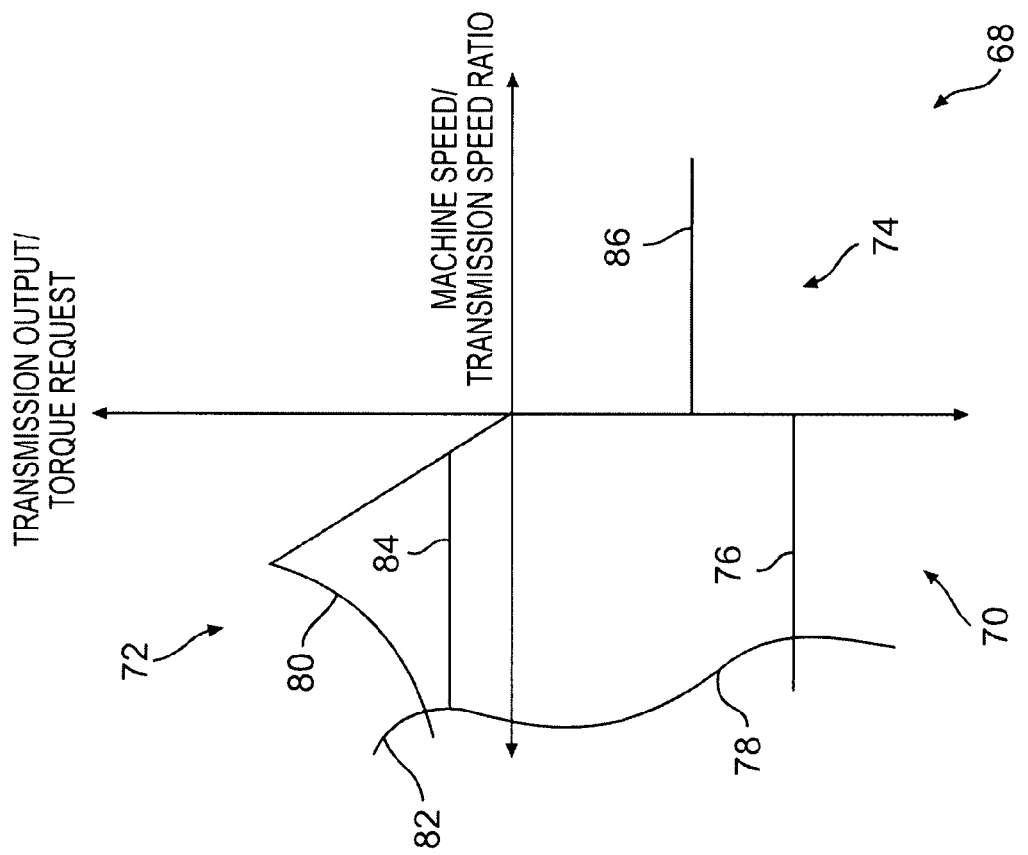
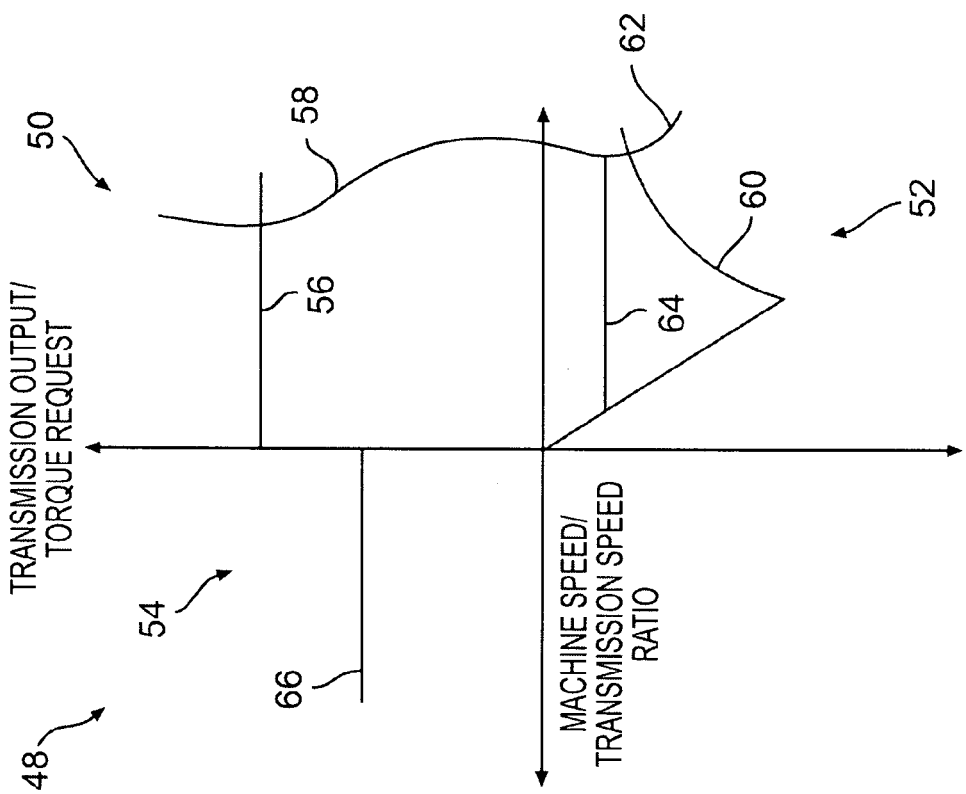
FIG. 5
FIG. 4

TORQUE-BASED CONTROL SYSTEM FOR A CONTINUOUSLY VARIABLE TRANSMISSION

TECHNICAL FIELD

The present disclosure is directed to a control system for a continuously variable transmission, and more particularly, to a torque-based control system for a continuously variable transmission.

BACKGROUND

Machines such as, for example, wheel loaders, dozers, backhoes, dump trucks, and other heavy equipment are used to perform many tasks. To effectively perform these tasks, the machines require an engine that provides significant torque through a transmission to one or more ground engaging devices. Often, these machines utilize continuously variable transmissions (CVT) for increased engine efficiency.

A CVT is an automatic type of transmission that provides an infinite number of output ratios within its ratio range. For example, a hydraulic CVT includes a pump and a fluid motor that receives pressurized fluid from the pump. Depending on a discharge flow rate and pressure of the pump, the motor speed and output torque at the ground engaging device may be varied. An electric CVT includes a generator and an electric motor that receive s current from the generator. Depending on the current supplied to the motor, the motor speed and output torque may be varied.

An example of a system used to control a conventional CVT is described in U.S. Pat. No. 4,793,217 (the '217 patent) issued to Morisawa et al. on Dec. 27, 1988. The control system disclosed in the '217 patent is a speed based system that adjusts a speed of an input shaft of the CVT to maintain a target output. The CVT operates in a plurality of modes such as forward and reverse, wherein each operation mode has a unique map assigned to it. In addition, each map indicates a relationship between a target speed of the input shaft of the CVT and an engine output for the associated mode. When the CVT is actuated, a controller determines in which mode the CVT is operating and selects the map designed for that mode. The controller then adjusts the speed of the input shaft according the map to attain the desired engine output.

Although the control system disclosed in the '217 patent may produce a desired engine output for a plurality of operating modes, the application of the system may be limited. In particular, because each input invokes only one map, there may be little variety of in the types of maps available. Such a reduced variety may limit the diversity of task and environments in which the transmission and ultimately the associated machine may operate.

The disclosed apparatus is directed to overcoming one or more of the problems set forth above.

SUMMARY

In one aspect, the present disclosure is directed toward a continuously variable transmission including a driven element. The continuously variable transmission also includes at least one operator input device configured to transmit a transmission operating mode request and at least one other operator input device configured to transmit a driven element output request. In addition, the continuously variable transmission includes at least one sensor configured to sense at least one parameter indicative of an operating condition of the transmission. The continuously variable transmission further includes a controller configured to regulate an output of the driven element in response to the operating mode request, the driven element output request, and the at least one sensed parameter indicative of an operating condition of the transmission.

Consistent with another aspect of the disclosure, a method is provided for operating a transmission. The method includes receiving an operating mode request, receiving a transmission output request, and sensing at least one parameter indicative of an operating condition of the transmission. The method also includes controlling an output of the transmission in response to the operating mode request, the transmission output request, and the at least one parameter indicative of an operating condition of the transmission.

BRIEF DESCRIPTION OF THE DRAWINGS

FIG. 4 is an exemplary disclosed control map for use with the control system of FIG. 3;

FIG. 5 is an exemplary disclosed control map for use with the control system of FIG. 3;

DETAILED DESCRIPTION

Figure 1:
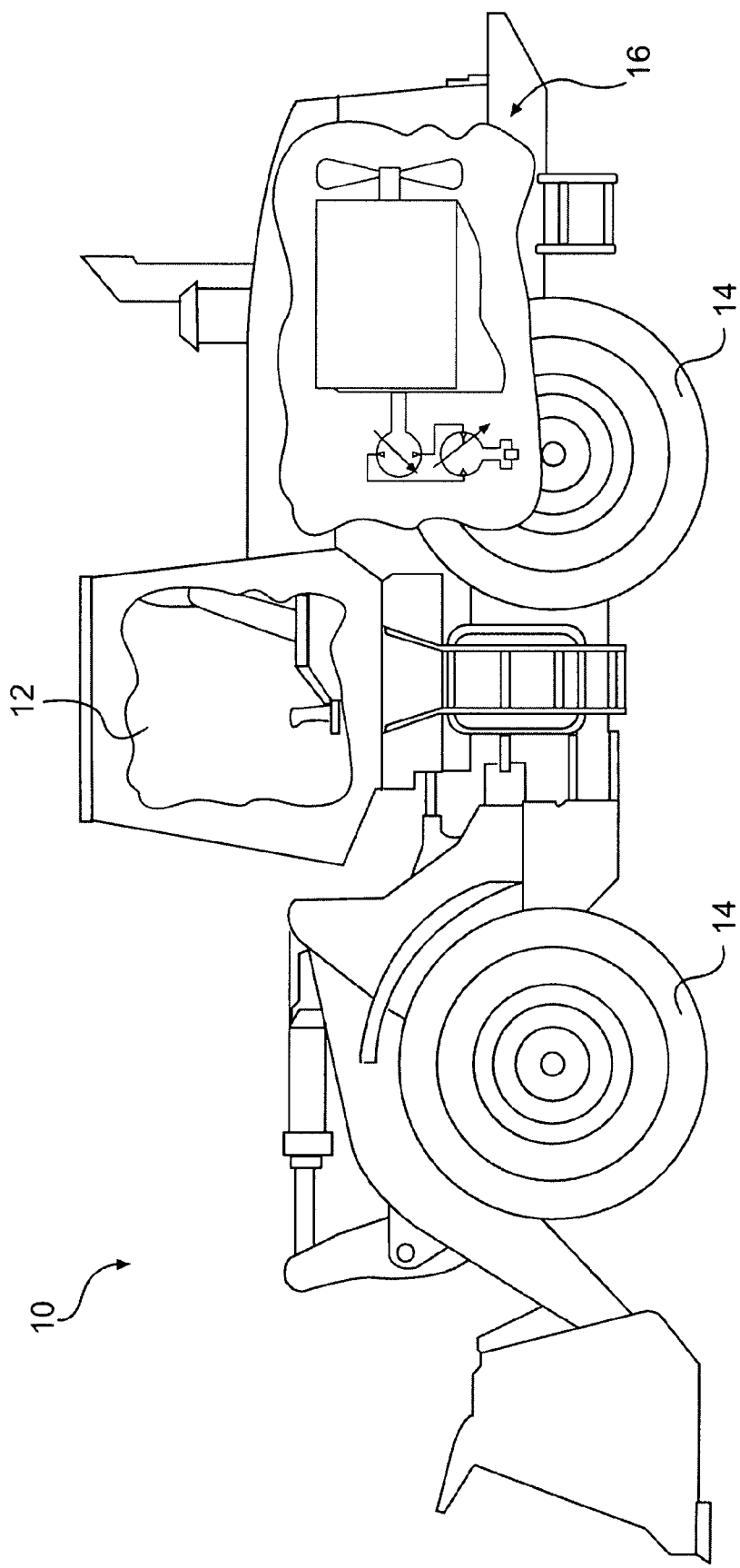
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the wheel loader depicted in FIG. 1, a bus, a highway haul truck, or any other type of mobile machine known in the art. Machine 10 may include an operator station 12, one or more traction devices 14, and a power train 16 operatively connected to drive at least one of traction devices 14.

Figure 2:
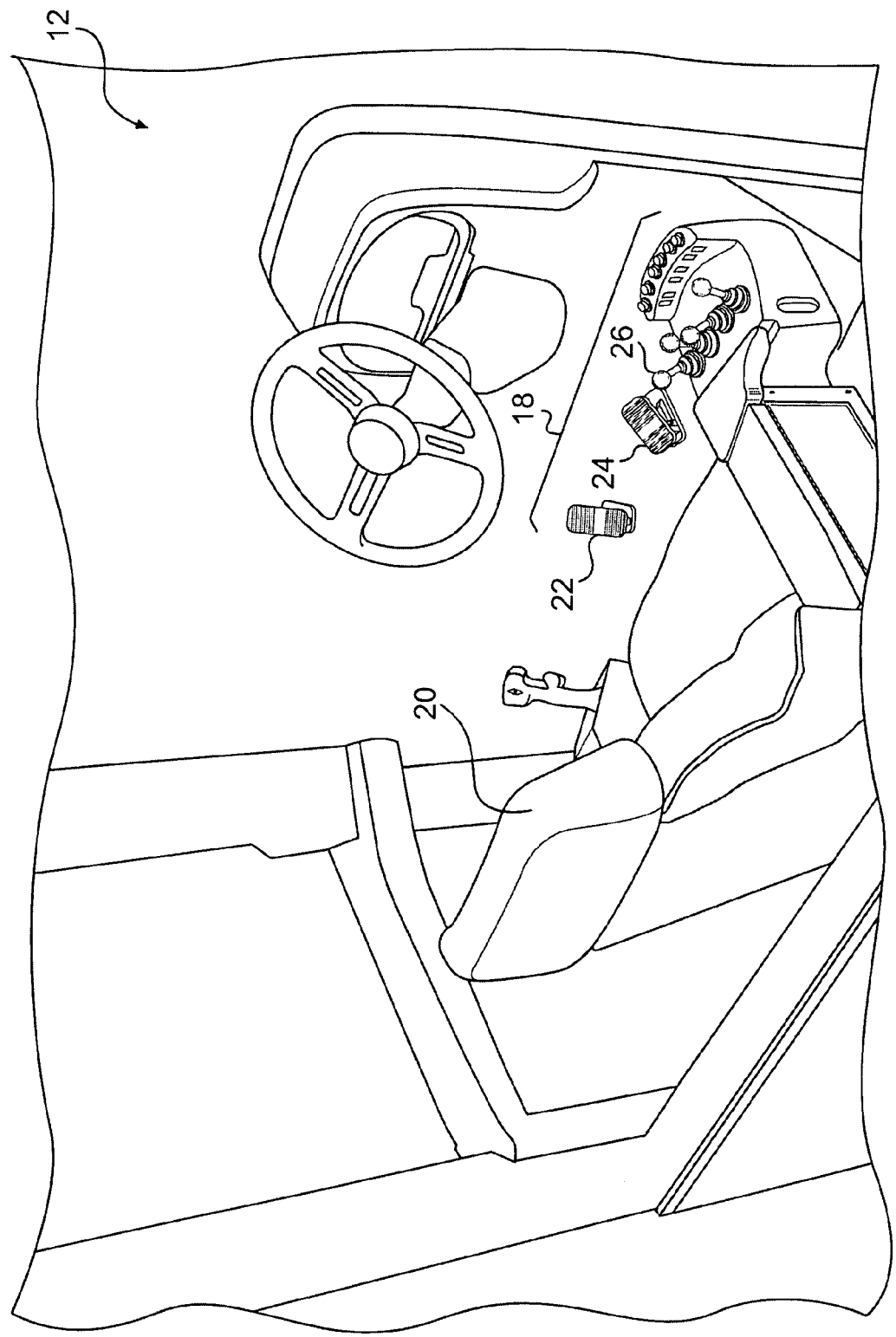
FIG. 2 is a pictorial illustration of an exemplary disclosed operator station for use with the machine of FIG. 1.

As illustrated in FIG. 2, operator station 12 may include devices that receive input from a machine operator indicative of a desired machine travel maneuver. Specifically, operator station 12 may include one or more operator interface devices 18 located proximate an operator seat 20. Operator interface devices 18 may initiate movement of machine 10 by producing signals that are indicative of a desired machine maneuver. In one embodiment, operator interface devices 18 may include a left foot pedal 22, a right foot pedal 24, and a forward-neutral-reverse (FNR) selector 26. As an operator manipulates left foot pedal 22 and/or right foot pedal 24 (i.e., displaces left and/or right foot pedals 22 and 24 away from a neutral position), the operator may expect and affect a corresponding machine travel movement. In addition, as the operator moves FNR selector 26 to a forward, reverse, or neutral position, the operator may affect a corresponding transmission operating mode such as, for example, forward, reverse, or idle. It is contemplated that in some embodiments, operator station 12 may include a speed limit switch (not shown), which may set a speed threshold above which machine 10 may not travel. It is further contemplated that operator interface devices other than foot pedals such as, for example, joysticks, levers, switches, knobs, wheels, and other devices known in the art, may additionally or alternatively be provided within operator station 12 for travel control of machine 10, if desired. Furthermore, FNR selector 26 may be omitted and other operator input devices may affect the transmission operating mode.

Traction devices 14 (referring to FIG. 1) may embody wheels located on each side of machine 10 (only one side shown). Alternatively, traction devices 14 may include tracks, belts or other known traction devices. It is contemplated that any combination of the wheels on machine 10 may be driven and/or steered.

Figure 3:
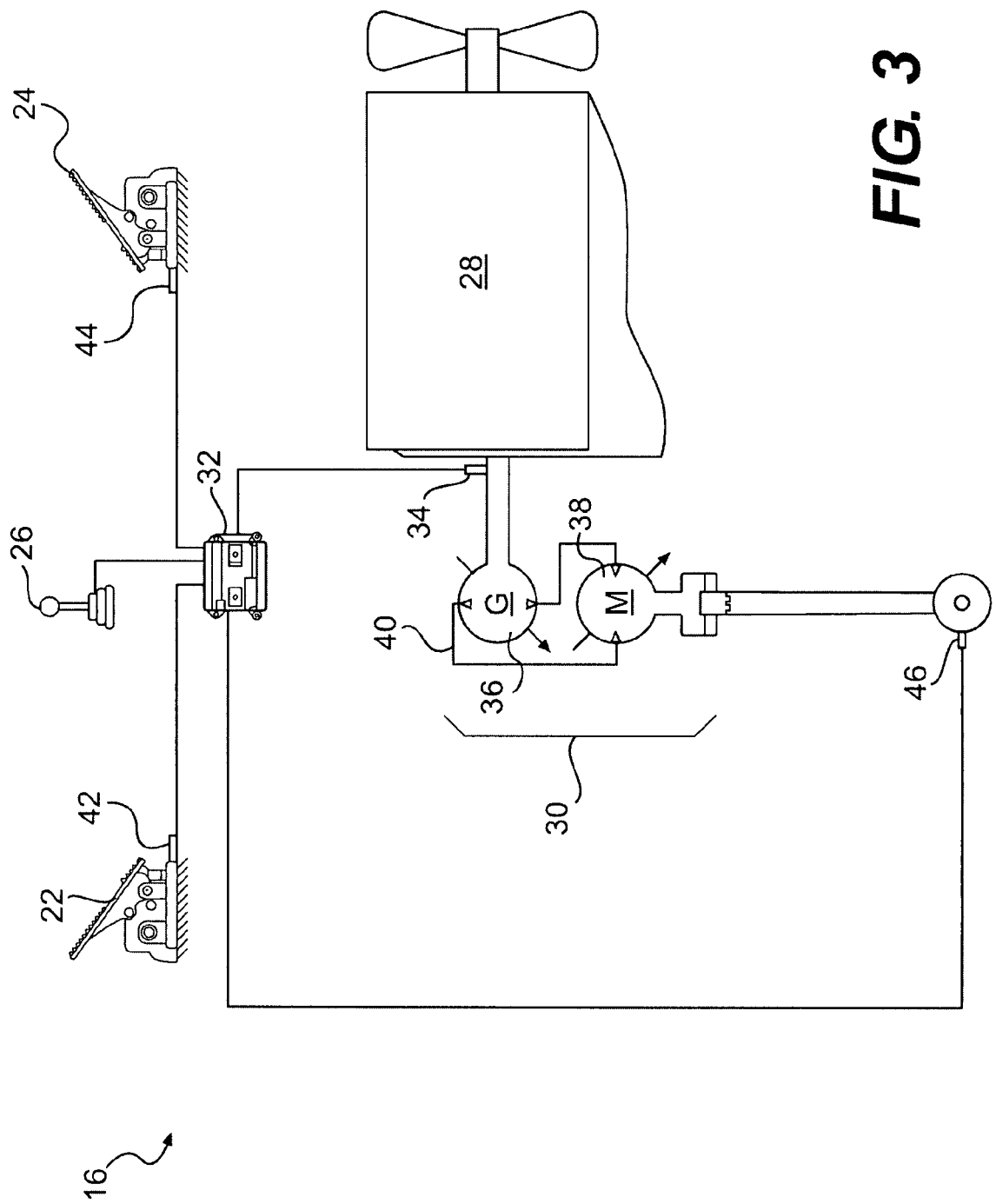
FIG. 3 is a diagrammatic illustration of an exemplary disclosed control system for use with the operator station of FIG. 2.

As illustrated in FIG. 3, power train 16 may be an integral package configured to generate and transmit power to traction devices 14. In particular, power train 16 may include a power source 28 operable to generate a power output, a transmission unit 30 connected to receive the power output and transmit the power output in a useful manner to traction devices 14 (referring to FIG. 1), and a control module 32 configured to regulate the operation of transmission unit 30 in response to one or more inputs.

Power source 28 may include an internal combustion engine having multiple subsystems that cooperate to produce mechanical or electrical power output. For the purposes of this disclosure, power source 28 is depicted and described as a four-stroke diesel engine. One skilled in the art will recognize, however, that power source 28 may be any other type of internal combustion engine such as, for example, a gasoline or a gaseous fuel-powered engine. The subsystems included within power source 28 may include, for example, a fuel system, an air induction system, an exhaust system, a lubrication system, a cooling system, or any other appropriate system.

A sensor 34 may be associated with power source 28 to sense an output speed thereof. In one example, sensor 34 may embody a magnetic pickup type of sensor associated with a magnet embedded within a rotational component of power train 16 such as a crankshaft or flywheel. During operation of power source 28, sensor 34 may sense the rotating magnetic field produced by the magnet and generate a signal corresponding to the rotational speed of power source 28.

Transmission unit 30 may embody, for example, a continuously variable transmission (CVT). Transmission unit 30 may be any type of continuously variable transmission such as, for example, a hydraulic CVT, a hydro-mechanical CVT, an electric CVT, or other configuration as would be apparent to one skilled in the art. In the exemplary electric CVT of FIG. 3, driving element 36 may be a generator, such as a three-phase permanent magnet alternating field-type generator, and driven element 38 may be an electric motor, such as permanent magnet alternating field-type motor configured to receive power from driving element 36. The generator of driving element 36 may be connected to drive the motor of driven element 38 with electric current via power electronics 40 in response to a torque command directed to driven element 38. In some situations, the motor of driven element 34 may alternatively drive the generator of driving element 36 in reverse direction via power electronics 40. It is contemplated that, in embodiments utilizing a hydraulic continuously variable transmission unit, driving element 36 may be a pump, such as a variable displacement pump, and driven element 38 may be a motor, such as a variable displacement motor. Driven element 38 may be fluidly connected to driving element 36 by conduits that supply and return fluid to and from driving element 36 and driven element 38, allowing driving element 36 to effectively drive driven element 38 by fluid pressure.

Transmission unit 30 may be at least partially controlled with left and right foot pedals 22 and 24. That is, as left and right foot pedals 22 and 24 are manipulated by an operator, the foot pedals may provide electric signals signifying a desired driven element output such as, for example, a desired torque output and/or a desired speed limit. For example, left and right foot pedals 22 and 24 may have a minimum position and be movable through a range of positions to a maximum position. Sensor 42 and 44 may be provided in association with each of left and right foot pedals 22 and 24, respectively, to sense the displacement positions thereof and produce corresponding signals responsive to the displaced positions. Sensors 42 and 44 may be any sensor capable of sensing the displacement of foot pedals 42 and 44 such as, for example, a switch or potentiometer. The displacement signals from each of sensors 42 and 44 may be directed through control module 32 to transmission unit 30 to control the torque output of driven element 38.

A sensor 46 may be associated with transmission unit 30 and/or traction device 14 (referring to FIG. 1) to sense a travel speed of machine 10. In one example, sensor 46 may embody a magnetic pickup type of sensor associated with a magnet embedded within a rotational component of power train 16 such as a transmission output shaft. During operation of machine 10, sensor 46 may sense the rotating magnetic field produced by the magnet and generate a signal corresponding to the rotational speed of transmission unit 30 and/or the corresponding travel speed of machine 10.

Control module 32 may embody a single microprocessor or multiple microprocessors for controlling the operation of power train 16 in response to the received signals. Numerous commercially available microprocessors can be configured to perform the functions of control module 32. It should be appreciated that control module 32 could readily embody a general machine microprocessor capable of controlling numerous machine functions. Control module 32 may include a memory, a secondary storage device, a processor, and any other components for running an application. Various other circuits may be associated with control module 32 such as power supply circuitry, signal conditioning circuitry, solenoid driver circuitry, and other types of circuitry.

A plurality of base control maps may be stored within the memory of control module 32 and may be grouped together based on a transmission operating mode. For example, the base control maps may be divided into forward, neutral, and reverse groups. Such groups may be selected in response to a signal indicative of a position of FNR selector 26. In addition, each base map may include a plurality of sub-maps. Each of these base maps and sub-maps may be in the form of tables, graphs, and/or equations and include a compilation of data collected from lab and/or field operation of power train 16.

FIG. 4 illustrates an exemplary forward base control map 48 having a plurality of sub-maps, which may be utilized by control module 32 when FNR selector 26 is set to a forward position. Forward base control map 48 may include a propulsion sub-map 50 controlling a forward propulsion of machine 10, a retarding sub-map 52 controlling a retarding of the forward propulsion, and a directional shift sub-map 54 controlling a backward speed of machine 10. Furthermore, each sub-map may have an x-axis (independent axis) representing either a machine speed or a transmission ratio and a y-axis (dependent axis) representing either a transmission output or a torque request. It is contemplated that each sub-map may include limits for torque, machine speed, and/or propulsion power. For example, propulsion sub-map 50 may include a maximum torque limit 56 and a maximum speed limit 58. In addition, retarding sub-map 52 may include a maximum retarding force limit 60, a maximum speed limit 62, and a maximum coasting retarding force 64. Furthermore, directional shift sub-map 54 may include a maximum torque limit 66. It should be understood that although the limits for torque, machine speed, and propulsion power are illustrated as continuous curves or lines, the limits may be discontinuous. In addition, it is contemplated that each sub-map may include additional limits that are not illustrated in FIG. 4, if desired.

FIG. 5 illustrates an exemplary reverse base control map 68 having a plurality of sub-maps, which may be utilized by control module 32 when FNR selector 26 is set to a reverse position. Reverse base control map 68 may include a propulsion sub-map 70 controlling a backward propulsion of machine 10, a retarding sub-map 72 controlling a retarding of the backward propulsion, and a directional shift sub-map 74 controlling a forward speed of machine 10. Similar to the forward sub-maps, each reverse sub-map may have an x-axis (independent axis) representing either a machine speed or a transmission ratio and a y-axis (dependent axis) representing either a transmission output or a torque request. In addition, it is contemplated that each sub-map may include limits for torque, machine speed, and/or propulsion power. For example, propulsion sub-map 70 may include a maximum torque limit 76 and a maximum speed limit 78. In addition, retarding sub-map 72 may include a maximum retarding force limit 80, a maximum speed limit 82, and a maximum coasting retarding force 84. Furthermore, directional shift sub-map 74 may include a maximum torque limit 86. It should be understood that although the limits for torque, machine speed, and propulsion power are illustrated as continuous curves or lines, the limits may be discontinuous. In addition, it is contemplated that each sub-map may include additional limits that are not illustrated in FIG. 5, if desired.

The base maps stored in the memory of control module 32 may be modified so that the dependent variables represented on the y-axis may be normalized to a unit measurement. For example, the dependent variables may be normalized to a unit measurement of acceleration such as normalized traction. Normalizing the dependant variable, may allow the maps to be utilized across multiple machines of similar size. It should be understood that when utilizing maps across multiple machines, machine parameters may need to be entered into the algorithm. Such parameters may include, for example, wheel radius, machine mass, bevel gear ratio, differential gear ratio, and/or any other parameter that may affect the movement of machine 10. In addition, the dependant variables represented on the y-axis of the maps may be shifted and/or scaled based on multiple inputs. Such inputs may include, for example, right and left pedal positions, FNR selector position, desired speed limit selector position, highest allowable virtual gear, parking brake status, transmission engagement flag, or any other input that may affect the dependent variables.

Figure 7:
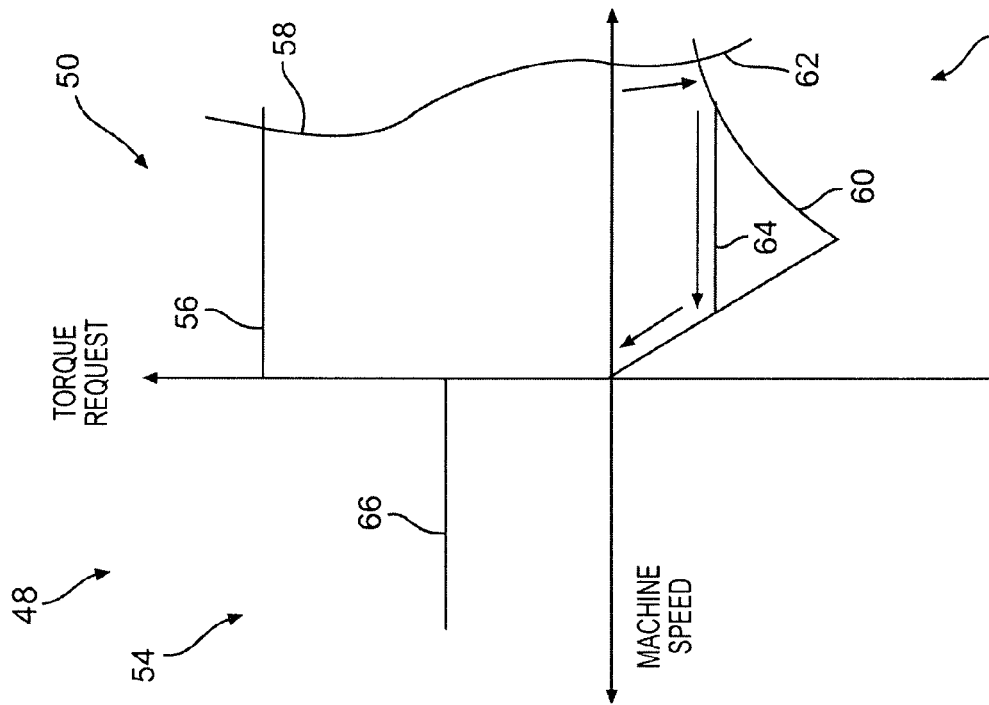
FIG. 7 is an exemplary disclosed control map for use with the control system of FIG. 3.
Figure 6:
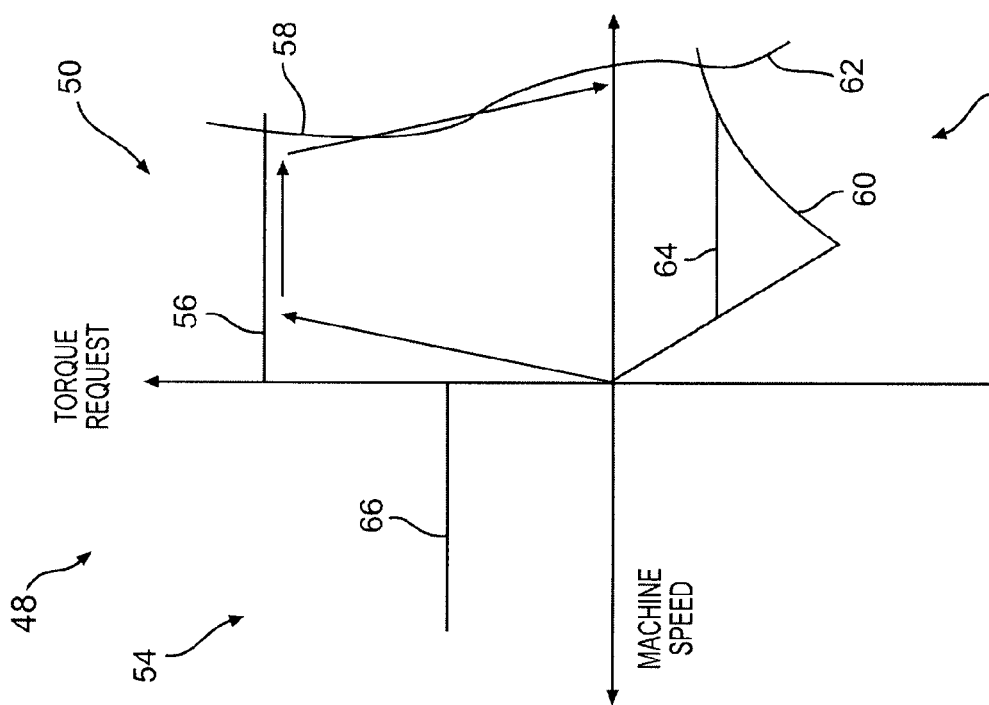
FIG. 6 is an exemplary disclosed control map for use with the control system of FIG. 3.

FIGS. 6 and 7 are graphical representations depicting exemplary paths that an operator request may take in response to different operator actions. FIGS. 6 and 7 will be discussed further in the following section to better illustrate the disclosed system and its operation.

INDUSTRIAL APPLICABILITY

The disclosed control system may be applicable to any vehicle having a torque controlled CVT. In particular, by selecting a particular base control map from a plurality of base control maps and a particular sub-map from a plurality of sub-maps in response to multiple inputs, the control system may efficiently and accurately determine a desired torque output that the transmission may follow under various environmental and vehicular conditions. The selection of a base control map, an associated sub-map, and an ensuing control path for an output request will be described below.

The operator may initiate the selection of a base control map by setting FNR selector 26 to a desired position. Control module 32 may receive a signal indicative of the position of FNR selector 26 and select the appropriate base control map accordingly. For example, if the operator sets FNR selector 26 to a forward position, a signal indicative of the forward position may be transmitted from FNR selector 26 to control module 32 either wirelessly or via a communication line. Upon receiving the signal, control module 32 may select forward base control map 48. It is contemplated that the selection of the base control map may be made independent of operator input, if desired. In such an embodiment, control module 32 may select a base control map based on other input factors such as, for example, a direction of an engine countershaft rotation, direction of rotation of traction devices 14, or any other parameter indicative of a direction of vehicular movement or idle condition.

After a base control map has been selected, control module 32 may receive input from a plurality of sources and determine a desired control path that transmission unit 30 may follow. Such input may include the displacement of left foot pedal 22 received via sensor 42, the displacement of right foot pedal 24 received via sensor 44, the output speed of power source 28 received via sensor 34, and the output speed of transmission unit 30 received via sensor 46. It is contemplated that other sources of input may be relied upon when determining a desired output command. For example, control module 32 may receive a signal from a speed limit selector limiting the maximum speed machine 10 may travel, a signal from operator input devices 18 indicative of a highest allowable virtual gear, and/or a signal indicative of whether the parking brake is engaged.

A first example of selecting a base map and ensuing control path is illustrated in FIG. 6. FIG. 6 illustrates forward base control map 48 and a control path selected to cause machine 10 to accelerate from a standstill. Because the operator may desire to move machine 10 in a forward direction, the operator may move FNR selector 26 to a forward position. A signal may be transmitted to control module 32 indicating that FNR selector 26 has been set to a forward position. Upon receiving the signal, control module 32 may select forward base control map 48 illustrated in FIG. 6.

Control module 32 may receive input signals from various sources to select an appropriate sub-map. In particular, control module 32 may receive signals from sensors 34 and 46 indicating that machine 10 may be at a standstill. In addition, control module 32 may receive a signal from sensor 44 that the operator is depressing right pedal 24 to increase the torque output. In response the above-mentioned input signals, control module 32 may determine that the operator desires to propel machine 10 in a forward direction. Therefore, control module 32 may select propulsion sub-map 50 of forward base control map 48.

After selecting the appropriate map, control module 32 may increase the torque output of transmission unit 30 in response to the torque output increase request transmitted by sensor 44. As the torque output is increased, control module 32 may continuously compare the torque output to maximum torque limit 56. It is contemplated that maximum torque limit 56 may be shifted or scaled in response to input from operator interface devices 18 or may be built into the control strategy algorithm. If the output torque of transmission 30 is less than maximum torque limit 56, control module 32 may continue increasing the torque output per the request transmitted by sensor 44. However, if the output torque equals maximum torque limit 56, control module 32 may override the signal from sensor 44 requesting the output torque increase and may maintain the output torque at a level equivalent to maximum torque limit 56.

While maintaining the output torque at a constant level, control module 32 may continuously compare the speed of machine 10 to maximum speed limit 58. If the speed of machine 10 is less than maximum speed limit 58, control module 32 may maintain the magnitude of the output torque. However, if the speed of machine 10 is equal to maximum speed limit 58, control module 32 may reduce the output torque to maintain the speed of machine 10 at maximum speed limit 58. Similar to maximum torque limit 56, maximum speed limit 58 may be shifted or scaled in response to input from operator interface devices 18 or may be built into the control strategy algorithm.

A second example of selecting a base map and ensuing control path is illustrated in FIG. 7. FIG. 7 illustrates forward base control map 48 and a control path selected to cause machine 10 to coast from an initial speed to a stop. Because machine 10 may already be moving in a forward direction, FNR selector 26 may already be set to a forward position. Therefore, the signal indicative of the forward position of FNR selector 26 may already have been transmitted to control module 32, and forward base control map 48 illustrated in FIG. 7 may already be selected.

Control module 32 may select the appropriate sub-map based on input signals received from various sources. In particular, control module 32 may receive signals from sensors 34 and 46 indicating that machine 10 may be moving at a particular speed. In addition, control module 32 may receive a signal from sensor 42 indicating that both left pedal 22 and right pedal 24 may be in a neutral position. In response the above-mentioned input signals, control module 32 may determine that the operator desires that machine 10 may coast from an current vehicular speed to a stop. Therefore, control module 32 may select retarding sub-map 52 of forward base control map 48.

After selecting the appropriate sub-map, control module 32 may increase a retarding force of transmission unit 30 until the magnitude of retarding force reaches maximum coasting retarding force limit 64. It is contemplated that maximum coasting retarding force limit 64 may be shifted or scaled in response to input from operator interface devices 18 or may be built into the control strategy algorithm. After reaching maximum coasting retarding force limit 64, the retarding force may be kept constant until maximum retarding force limit 60 is reached. Once maximum retarding force limit 60 has been reached, control module 32 may reduce the retarding force until machine 10 has stopped.

Because the disclosed control system may interpret multiple inputs to determine a desired combination of base control maps and sub-maps, the flexibility of the control system may be increased. In addition, the use of combinations of control maps to create a desired control path may increase the number of possible control paths beyond the number of available maps, increasing the flexibility of the system. Such flexibility may increase the variety of environments and applications for which the transmission and ultimately the associated machine may be used.

It will be apparent to those skilled in the art that various modifications and variations can be made to the disclosed operator interface. Other embodiments will be apparent to those skilled in the art from consideration of the specification and practice of the disclosed operator interface. It is intended that the specification and examples be considered as exemplary only, with a true scope being indicated by the following claims and their equivalents.

What is claimed is:

1. A continuously variable transmission, comprising:
    a driven element;
    at least one operator input device configured to transmit a transmission operating mode request;
    at least one other operator input device configured to transmit a driven element output request;
    at least one sensor configured to sense at least one parameter indicative of an operating condition of the transmission; and
    a controller configured to regulate an output of the driven element by selecting selection of, based on the transmission operating mode request, a map from a plurality of maps stored in a memory, and by selection of one of a plurality of sub-maps from the selected map based on the driven element output request and the at least one parameter, wherein the plurality of maps includes a forward base control map and a reverse base control map, the forward base control map includes a forward propulsion, a forward retarding, and a forward directional shift sub-map, and the reverse base control map includes a reverse propulsion, a reverse retarding, and a reverse directional shift sub-map.

2. The continuously variable transmission of claim 1, wherein the controller is configured to select the map based on whether the transmission operating mode request is a request to operate in a forward mode, a reverse mode, or a neutral mode.

3. The continuously variable transmission of claim 2, further including at least one additional operator input device configured to transmit a request to limit the output of the driven element.

4. The continuously variable transmission of claim 3, wherein the controller is configured to regulate the output of the driven element in response to the request to limit the output of the driven element.

5. The continuously variable transmission of claim 4, wherein each sub-map includes at least one limitation curve limiting the output of the driven element, and the controller is configured to modify each limitation curve in response to the request to limit the output of the driven element.

6. The continuously variable transmission of claim 1, wherein the at least one operator input device configured to transmit the transmission operating mode request includes a forward-neutral-reverse selector.

7. The continuously variable transmission of claim 6, wherein the at least one other operator input device configured to transmit the driven element output request includes either or both of a left foot pedal and a right foot pedal.

8. A method of operating a transmission, comprising:
    receiving an operating mode request;
    receiving a transmission output request;
    sensing at least one parameter indicative of an operating condition of the transmission; and
    controlling an output of the transmission by selecting, based on the operating mode request, a map from a plurality of maps stored in a memory, and by selecting one of a plurality of sub-maps from the selected map based on the transmission output request and the at least one parameter, wherein the plurality of maps includes a forward base control map and a reverse base control map, the forward base control map includes a forward propulsion, a forward retarding, and a forward directional shift sub-map, and the reverse base control map includes a reverse propulsion, a reverse retarding, and a reverse directional shift sub-map.

9. The method of claim 8, wherein controlling the output includes commanding a torque output of an driven device.

10. The method of claim 8, further including:
receiving at least one transmission output limit request; and
controlling the output of the transmission based on the at least one transmission output limit request.

11. The method of claim 8, wherein the operating mode request is received from a forward-neutral-reverse selector.

12. The method of claim 11, wherein the transmission output request is received from either or both of a left foot pedal and a right foot pedal.

13. A machine, comprising:
a power source configured to generate a power output;
at least one traction device configured to propel the machine;
an operator station configured to receive input from an operator indicative of a desired machine movement; and
a continuously variable transmission, including:
a driven element;
at least one operator input device configured to transmit a transmission operating mode request;
at least one other operator input device configured to transmit a driven element output request;
at least one sensor configured to sense at least one parameter indicative of an operating condition of the transmission; and
a controller configured to regulate an output of the driven element by
selection of either a forward base control map or a reverse base control map, each of which are stored in a memory, based on the transmission operating mode request, and
based on the driven element output request and the at least one parameter, selection of a forward propulsion sub-map, a forward retarding sub-map, or a forward directional shift sub-map when the forward base control map has been selected, or selection of a reverse propulsion sub-map, a reverse retarding sub-map, or a reverse directional shift sub-map when the reverse base control map has been selected.

14. The machine of claim 13, further including at least one additional operator input device configured to transmit a request to limit the output of the driven element.

15. The machine of claim 14, wherein the controller is configured to regulate the output of the driven element in response to the request to limit the output of the driven element.

16. The machine of claim 15, wherein each sub-map includes at least one limitation curve limiting the output of the driven element.

17. The machine of claim 16, wherein, the controller is configured to modify each limitation curve in response to the request to limit the output of the driven element.

18. The machine of claim 13, wherein the at least one operator input device configured to transmit the transmission operating mode request includes a forward-neutral-reverse selector.

19. The machine of claim 18, wherein the at least one other operator input device configured to transmit the driven element output request includes either or both of a left foot pedal and a right foot pedal.

* * * * *